United States Patent
Farivar et al.

(10) Patent No.: US 10,657,445 B1
(45) Date of Patent: May 19, 2020

(54) SYSTEMS AND METHODS FOR TRAINING AND EXECUTING A NEURAL NETWORK FOR COLLABORATIVE MONITORING OF RESOURCE USAGE

(71) Applicant: Capital One Services, LLC, McLean, VA (US)

(72) Inventors: Reza Farivar, Champaign, IL (US); Jeremy Goodsitt, Champaign, IL (US); Fardin Abdi Taghi Abad, Seattle, WA (US); Austin Walters, Savoy, IL (US); Mark Watson, Urbana, IL (US); Anh Truong, Champaign, IL (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/414,540

(22) Filed: May 16, 2019

(51) Int. Cl.
- *G06N 3/08* (2006.01)
- *G06F 16/28* (2019.01)
- *G06N 3/04* (2006.01)
- *G06Q 20/20* (2012.01)

(52) U.S. Cl.
CPC ............. *G06N 3/08* (2013.01); *G06F 16/285* (2019.01); *G06N 3/0445* (2013.01); *G06Q 20/204* (2013.01)

(58) Field of Classification Search
None
See application file for complete search history.

(56) References Cited

U.S. PATENT DOCUMENTS

| 5,819,226 | A | 10/1998 | Gopinathan et al. | |
|---|---|---|---|---|
| 6,029,144 | A | 2/2000 | Barrett et al. | |
| 2006/0253274 | A1* | 11/2006 | Miller | G06F 17/278 704/9 |
| 2007/0200087 | A1* | 8/2007 | Wehner | A61Q 5/02 252/70 |
| 2011/0258049 | A1* | 10/2011 | Ramer | G06Q 30/02 705/14.66 |
| 2012/0011040 | A1 | 1/2012 | Beydler et al. | |
| 2013/0151388 | A1* | 6/2013 | Falkenborg | G06Q 40/02 705/35 |

(Continued)

FOREIGN PATENT DOCUMENTS

EP     0897566 B1     2/1999

*Primary Examiner* — George Giroux
(74) *Attorney, Agent, or Firm* — Bookoff McAndrews, PLLC

(57) ABSTRACT

Disclosed are systems and methods for training and executing a neural network for collaborative monitoring of resource usage metrics. For example, a method may include receiving user data sets, grouping the user data sets into one or more clusters of user data sets, grouping each of the one or more clusters into a plurality of subclusters, for each of the plurality of subclusters, training the neural network to associate the subcluster with one or more sequential patterns found within the subcluster, grouping the plurality of user data sets into a plurality of teams, receiving a first series of transactions of a first user, inputting the first series of transactions into the trained neural network, classifying, using the trained neural network, the first user into a subcluster among the plurality of subclusters, generating a metric associated with the first series of transactions, generating a recommendation to the first user.

19 Claims, 7 Drawing Sheets

(56) References Cited

U.S. PATENT DOCUMENTS

| | | | |
|---|---|---|---|
| 2013/0254035 A1* | 9/2013 | Ramer | G06O 30/0267 |
| | | | 705/14.62 |
| 2014/0136381 A1* | 5/2014 | Joseph | G06Q 40/02 |
| | | | 705/35 |
| 2014/0201126 A1* | 7/2014 | Zadeh | A61B 5/4803 |
| | | | 706/52 |
| 2016/0255139 A1* | 9/2016 | Rathod | G06F 16/9535 |
| | | | 709/203 |
| 2019/0233510 A1* | 8/2019 | Mezler | A61K 39/3955 |

* cited by examiner

--Prior Art--

SYSTEMS AND METHODS FOR TRAINING AND EXECUTING A NEURAL NETWORK FOR COLLABORATIVE MONITORING OF RESOURCE USAGE

TECHNICAL FIELD

Various embodiments of the present disclosure generally relate to collaborative monitoring of resource usage metrics, and more particularly, to using a trained neural network or a specific set of rules to monitor collaborative resource usage of different user groups.

BACKGROUND

Electronic transactions generate computer-readable data that are frequently collected and stored. For example, when a user of a transaction instrument (e.g., mobile pay, online payment accounts, credit accounts, etc.) electronically transacts throughout a given period of time, the transaction data for the particular user can be collected and stored sequentially at a server of an issuer of the transaction instrument. Advantageously, such a server may leverage the sequentially stored transaction data to electronically compute or generate useful solutions. Thus, it is highly desirable for issuer servers of financial instruments to intelligently and effectively utilize the collected data to generate useful analytics, and provide practical feedback based thereon.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed to train and execute a neural network for collaborative monitoring of resource usage.

In one embodiment, a computer system is disclosed for training and executing a neural network for collaborative monitoring of resource usage metrics. The computer system may comprise: a memory having processor-readable instructions stored therein; and at least one processor configured to access the memory and execute the processor-readable instructions, which when executed by the processor configures the processor to perform a plurality of functions, including functions for: receiving or generating a plurality of user data sets, wherein each user data set of the plurality of user data sets comprises a user identification data of a user and a detailed user data of the user; grouping the plurality of the user data sets into one or more clusters of user data sets; grouping each of the one or more clusters into a plurality of subclusters; for each of the plurality of subclusters, training the neural network to associate the subcluster with one or more sequential patterns found within the subcluster, based on the user data sets in the subcluster, to generate a trained neural network; grouping the plurality of user data sets into a plurality of teams, each team in the plurality of teams including a plurality of teamed user data sets among the plurality of user data sets; receiving a first series of transactions of a first user, the first user corresponding to a first teamed user data set included in the plurality of teamed user data sets in a first team among the plurality of teams, and the first series of transactions including one or more transactions performed by the first user; inputting the first series of transactions into the trained neural network; classifying, using the trained neural network, the first user into a subcluster among the plurality of subclusters, based on the first series of transactions input into the trained neural network, to generate a classified subcluster of the first user; based on the classified subcluster of the first user, generating a metric associated with the first series of transactions; and generating a recommendation to the first user, the recommendation requesting the first user to enter the metric associated with the first series of transactions for updating one or more team metrics associated with the first team.

In accordance with another embodiment, a computer-implemented method is disclosed for collaborative monitoring of resource usage metrics. The computer-implemented method may comprise: receiving or generating, by one or more processors, a plurality of user data sets, wherein each user data set of the plurality of user data sets comprises a user identification data of a user and a detailed user data of the user; grouping, by the one or more processors, the plurality of user data sets into a plurality of teams, each team in the plurality of teams including a plurality of user data sets; receiving from a first user, at a user interface, a first series of transactions of the first user, the first user corresponding to a user data set included in the plurality of user data sets in a first team among the plurality of teams, and the first series of transactions including one or more transactions performed by the first user; classifying, by the one or more processors, the first series of transactions to a first category among a plurality of categories, based on a set of rules in an electronic rules repository; based at least in part on the first category, generating, by the one or more processors, a metric associated with the first series of transactions; and updating, by the one or more processors, a team standing associated with the first team based on the metric.

In accordance with another embodiment, a computer system is disclosed for training and executing a neural network for collaborative monitoring of resource usage metrics. The computer system may comprise: a memory having processor-readable instructions stored therein; and at least one processor configured to access the memory and execute the processor-readable instructions, which when executed by the processor configures the processor to perform a plurality of functions, including functions for: receiving or generating a plurality of user data sets, wherein each user data set of the plurality of user data sets comprises a user identification data of a user and a detailed user data of the user; removing personally identifiable information from each of the plurality of user data sets; grouping the plurality of the user data sets into one or more clusters of user data sets; grouping each of the one or more clusters into a plurality of subclusters; for each of the plurality of subclusters, training the neural network to associate the subcluster with one or more sequential patterns found within the subcluster, based on the user data sets in the subcluster, to generate a trained neural network; grouping the plurality of user data sets into a plurality of teams, each team in the plurality of teams including a plurality of teamed user data sets among the plurality of user data sets; receiving a first series of transactions of a first user, the first user corresponding to a teamed user data set included in the plurality of teamed user data sets in a first team among the plurality of teams, and the first series of transactions including one or more transactions performed by the first user; inputting the first series of transactions into the trained neural network; classifying, using the trained neural network, the first user into a subcluster among the plurality of subclusters, based on the first series of transactions input into the trained neural network, to generate a classified subcluster of the first user; based on the classified subcluster of the first user, generating a metric associated with the first series of transactions; generating a recommendation to the first user, the recommendation requesting the first user to enter the metric associated with the first series of transactions for updating one or more team metrics associated with the first team; in response to determining that the first user indicated an acceptance of the recommendation, updating a team standing associated with the first team based on the metric associated with the first series of transactions; in response to determining that the first user indicated an acceptance of the recommendation, updating a team score associated with the first team based on the metric, to generate an updated team score associated with the first team; in response to determining that first user accepted the recommendation, updating a ranked list of the plurality of teams, based on the updated team score associated with the first team; receiving one or more messages from one or more users included in the first team, each of the one or more messages comprising a metadata indicating a target user included in the first team; and transmitting each of the one or more messages to a device associated with the target user.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1A:
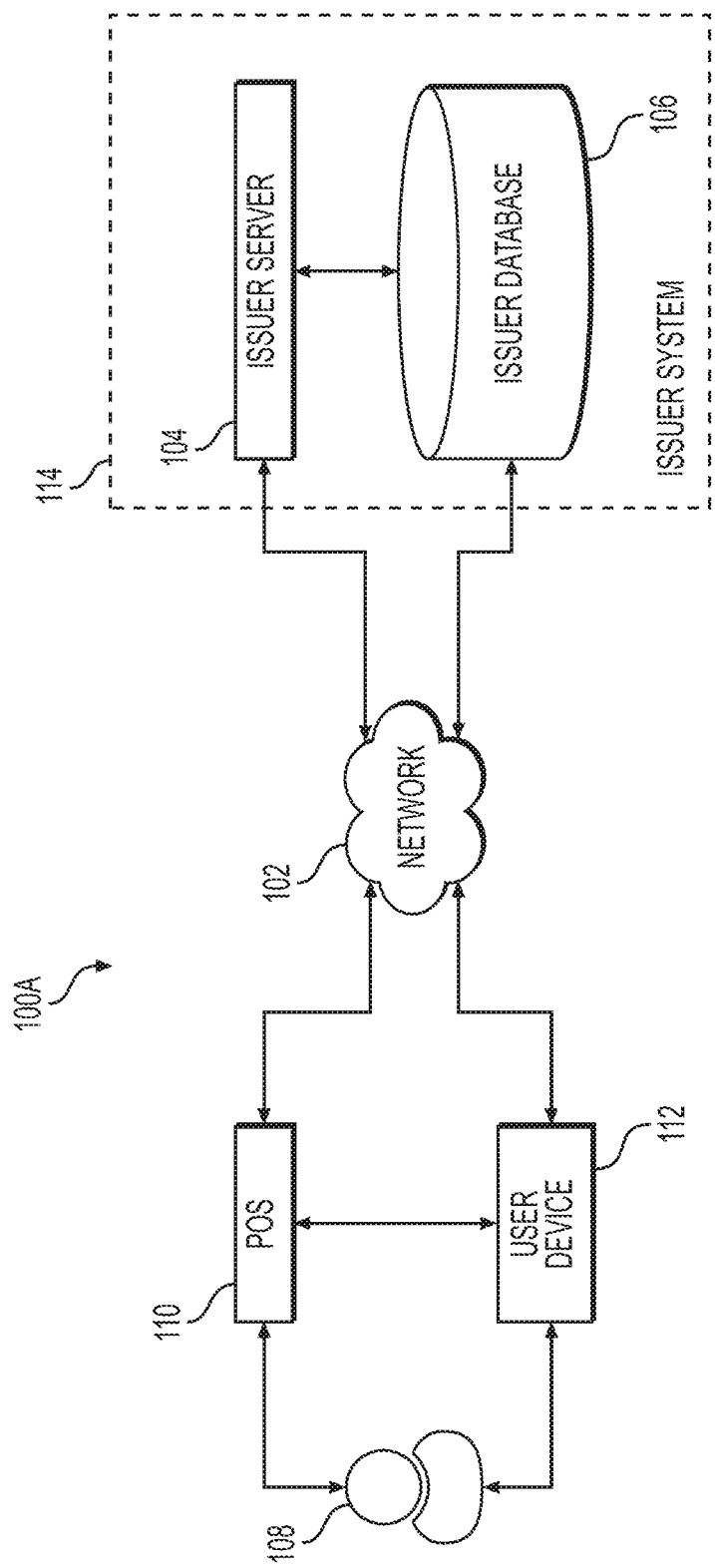
FIGS. 1A and 1B are diagrams of exemplary environments in which methods, systems, and other aspects of the present disclosure may be implemented.

The following embodiments describe systems and methods for a collaborative monitoring of resource usage metrics. Such monitoring may be performed on a series of transactions by training and executing a neural network such as, for example, a recurrent neural network (RNN), to dynamically classify the transactions and determine user-facing recommendations. If the user-facing recommendations are accepted by a user, the systems and methods of the present disclosure may enable dynamic updates in the collaboratively monitored resource usage. A specifically customized training of neural networks (e.g., RNNs) practically applied to transactions for providing a user-specific feedback and/or team-specific analytics are unconventional and innovative automations which necessarily achieve technological improvements through the specific process described in more detail below, in a sharp contrast to merely providing a well-known or routine environment for performing a manual or mental task. While RNNs are referenced throughout the application, alternative neural networks or decision support tools may be used for classification of user transactions. For example, any one or more of a convolutional neural network (CNN), a regional convolutional neural network (R-CNN), a decision tree, and/or a set of preset rules (e.g., mapping) may be used for dynamically classifying transactions, without departing from the scope of the disclosure.

Some users of electronic transaction instruments (e.g., mobile pay systems, online payment accounts, credit card accounts, etc.) may often make poor financial decisions such as impulsive purchases, serial purchases under hampered judgments (e.g., excessive gambling or alcohol consumption), or incurring of unnecessary expenses (e.g., penalties for failure to pay minimum balance(s)). According to aspects of the present disclosure, a unique subcluster-based training of an RNN may allow an issuer server system of a transaction instrument to use the trained RNN to dynamically, automatically, and accurately recognize the quality of user transactions. The transactions may be, for example, a series of transactions performed by a particular user. In some implementations, the recognition of the quality of user transactions may be made via intelligent classification mechanisms other than RNN or a neural network. Based on this recognition, the issuer system may dynamically update various team-based metrics corresponding to a pool of participating users, and display the updated metrics at user interfaces accessible by the participating users.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1A shows an exemplary environment 100A, according to one or more embodiments of the present disclosure. As shown, system environment 100A may include a network 102, an issuer server 104, an issuer database 106, an issuer system 114, a user 108, a point-of-sale (POS) system 110, and a user device 112. As used herein, an issuer system 114 may be a term that collectively refers to the issuer server 104 and the issuer database 106 in FIGS. 1A and 1B.

In FIG. 1A, the POS system 110 may be a hardware POS device at a physical location, such as a store, a restaurant, a transaction booth, a transaction cart, a food truck, an office, a place of residence, a vending machine, a gaming establishment, or any other physical location where purchase of goods or services may take place by a user 108 via an electronic transaction. The POS system 110 also may be a portable device carried by a merchant, a seller, a sales agent, or a delivery agent, which reads, accepts, or validates an electronic transaction, such as a credit card reader, a mobile payment reader, a payment processing application, or any other portable device serving the purpose of accepting and/or processing payments for commerce of goods or services. Additionally, or alternatively, the POS system 110 may be a virtual or online POS system for allowing a user 108 to engage in an electronic commerce transaction via a user device 112 over a network 102.

User 108 may engage in an electronic transaction with the POS system 110 in various ways. For example, user 108 may hand over a transaction instrument (e.g., a credit card, a debit card, etc.) to an operator of the POS system 110, initiate contact of the transaction instrument with the POS system 110 (e.g., by swiping, tapping, or inserting the transaction instrument), initiate contact of a user device 112 (e.g., a mobile phone) executing a mobile pay application to a POS system 110, connect a user device 112 executing a mobile pay application to POS system 110 via a near field communication (NFC) (e.g., contactless transaction instrument reader), or engage in an electronic transaction in any other manner which may allow the POS system 110 to directly or indirectly obtain information from the user's 108 transaction instrument.

Once the POS system 110 obtains sufficient data necessary to complete a particular transaction, the POS system 110 may transmit transaction data to the issuer server 104 over the network 102. This transmission of the transaction data to the issuer server 104 over network 102 may be a direct transmission or an indirect transmission (e.g., an initial transmission to an intermediary such as a card association system, followed by the intermediary transmitting at least a part of the data to the issuer server 104). The transaction data transmitted to the issuer server 104 may include any data received and/or generated by the POS system 110 during the transaction. For example, the transaction data may include a time stamp of the transaction, an identification of one or more merchants associated with the transaction, an identification of one or more purchasers associated with the transaction, an identification of one or more transaction instruments used in the transaction, an amount of fiscal resources expended for the transaction, and/or any other data relevant to the transaction and the POS system 110.

After collecting the transaction data, the issuer server 104 may record and store the transaction data in the issuer database 106. In system environment 100A, the POS system 110 may transmit a separate transaction data for each transaction, and the issuer server 104 may, in turn, receive and store each individual transaction data separately for each respective transaction. Handling each transaction data as separate entries may not only serve the purpose of providing the most accurate fiscal accounting for the user, but also prepare the most effective and accurate data sets for the RNN's training and classification tasks described in more detail below.

In one or more embodiments, the issuer server 104 and the issuer database 106 may be one server computer device and a single database, respectively. Alternatively, in one or more embodiments, the issuer server 104 may be a server cluster, or any other collection or network of a plurality of computer servers. The issuer database 106 also may be a collection of a plurality of interconnected databases. The issuer server 104 and the issuer database 106 may be components of one server system. Additionally, or alternatively, the issuer server 104 and the issuer database 106 may be components of different server systems, with the network 102 serving as the communication channel between them. As noted above, issuer system 114 may collectively refer to both the issuer server 104 and the issuer database 106.

Figure 1B:
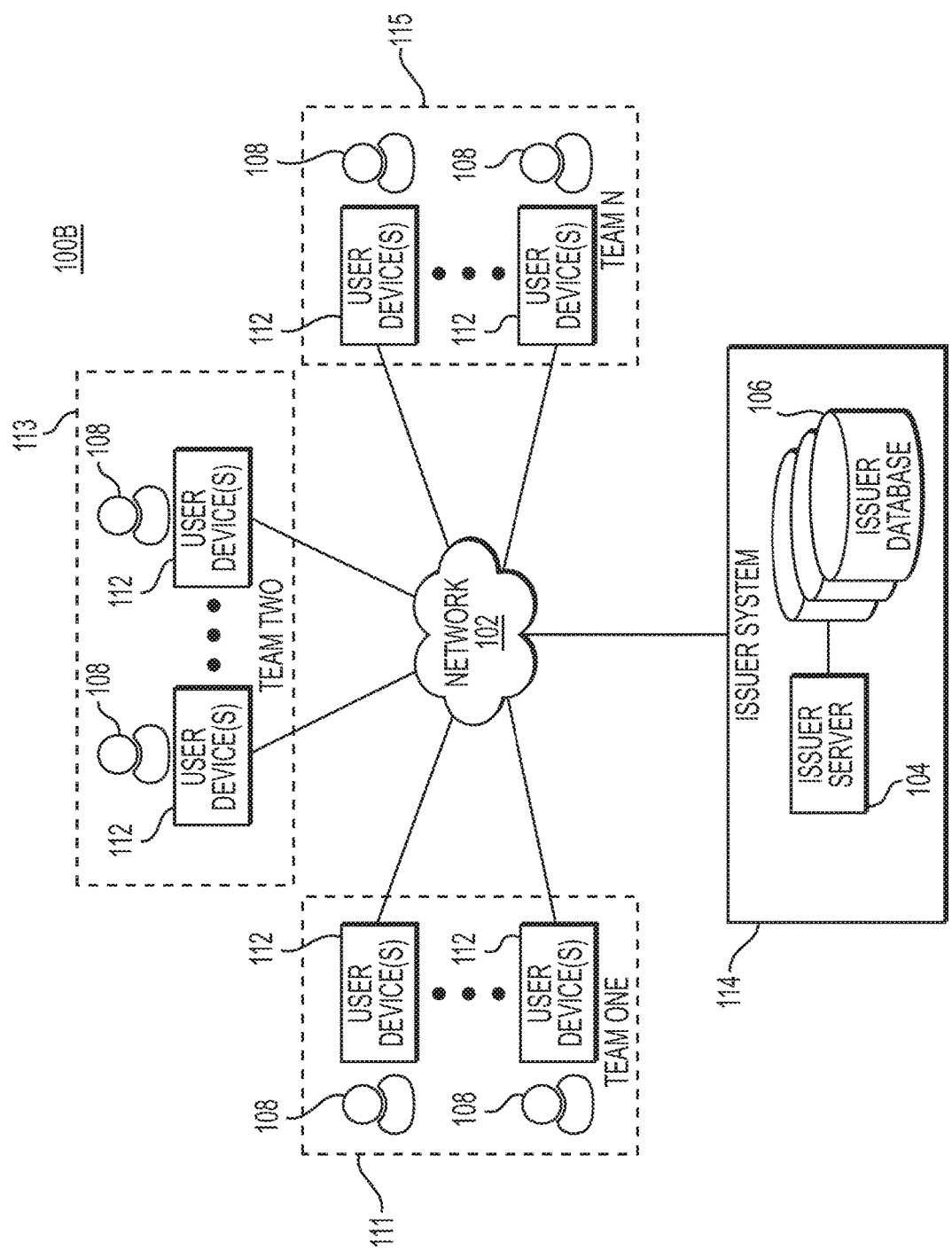

FIG. 1B depicts an exemplary environment 100B, according to one or more embodiments of the present disclosure. In some implementations, the components shown in the exemplary environment 100B may correspond to the components shown in the exemplary environment 100A. For example, the issuer system 114 of environments 100A and 100B may both refer to the same system. As another example, user devices 112 of exemplary environment 100B may include the user device 112 depicted in the exemplary environment 100A. In some implementations, the exemplary environments 100A and 100B may also refer to the same or overlapping environments, with the depicted components showing different aspects of the same environment. Additionally, or alternatively, the exemplary environment 100B may be an environment in which one or more components are different from the corresponding components in the exemplary environment 100A. For example, the issuer system 114, which is shown in both FIG. 1A and FIG. 1B, may be referring to a same or common component implemented at different times, different subcomponents belonging to the same component, or different components communicatively coupled to each other.

In FIG. 1B, user devices 112 may be in communication with the issuer system 114 over the network 102. One or more of the user devices 112 may correspond to a user 108.

For example, a first user 108 may have a plurality of user devices 112 (e.g., one or more laptop computers, one or more tablet devices, one or more mobile devices, etc.), all of which may be in communication with the issuer system 114 as devices of the first user 108. In addition, each user 108 may be a user of a transaction instrument (e.g., a credit card, a debit card, etc.) that is capable of transacting with a POS device 110, as described above with respect to FIG. 1A.

In the exemplary environment 100B, the issuer system 114 may group the users 108 into a plurality of teams (e.g., "team one" 111, "team two" 113, . . . , "team N" 115, as shown in FIG. 1B). Any finite number of teams may be formed, and the number of teams may be predetermined at the issuer server 104 or any other computing system in communication with the exemplary environment 100B. Additionally, the number of teams may be modified in order to account for circumstances such as, for example, additions of new users into the pool of participating users, and/or formation of additional or modified teams.

In some implementations, the plurality of teams may be grouped randomly. For example, the issuer server 104 or any other computing system in communication with the exemplary environment 100B may randomly group users 108 into a predetermined number of teams each having one or more predetermined sizes.

Additionally, or alternatively, the plurality of teams may be formed semi-randomly. For example, given a randomly formed set of tentative teams, the issuer server 104 or any other computing system in communication with the exemplary environment 100B may be configured to determine a collective metric for each of those tentative teams (e.g., average credit score of each team, average checking account balance of each team, etc.), and swap or transfer one or more users 108 between teams in such a way that differentials between the teams' collective metrics do not exceed a predetermined threshold (e.g., ensuring that the teams' average credit scores do not exceed a threshold of permitted differential, such as, e.g., 15%). During such a semi-random team formation process, the collective metric of tentative teams may be computed or determined based on user data sets each corresponding to a user 108, and the user data sets may be read or retrieved from any database in communication with the exemplary environment 1006, such as issuer database 106.

After the plurality of teams are formed, detailed information about the teams may be stored in any database in communication with the exemplary environment 1006, such as, for example, issuer database 106. The stored information about the teams, such as identifications of users who belong to each team, may be updated as needed. For example, when a new user joins the pool of participating users and is placed into a team, or when an existing user leaves the pool of participating users, the teams may be updated in accordance with one or more random or semi-random formation rules, as described in detail above. Team information updates may not be limited to updates to membership information. For example, information regarding team metrics may be updated in response to any modifications made to team metrics (e.g., team standings, team scores, and/or team rankings). Thus, updates to the information about the teams may occur dynamically and/or periodically. For example, the updates may be set to occur via periodic synchronizations, push or pull operations, synchronous or asynchronous updates, modifications made during scheduled maintenance, real-time updates in response to a detected event (e.g., an addition of a user activity), or any other known or suitable manner by which centrally stored information about the teams may be updated with authorized modifications.

Further, the exemplary environment 100B may include a user interface. The user interface may be displayed to each user 108 accessing the issuer system 114 as a team member, on at least one user devices 112. The user interface may include features to enable a user 108 to enter a user input, such as, for example, a series of transactions performed by the user, acceptance of a system recommendation to enter a series of transactions, or an instant message to another user in the same team. Features to enable a user 108 to enter such a user input may include, for example, a text field, pull down menu, a drop-down menu, a radio button group, speech-to-text interface, or any other known or suitable input mechanisms by which information regarding transactions or instant messages may be conveyed from a user 108.

The user interface may also include features to display detailed information about the teams, such as the team standings within each team, the team scores pertaining to each team, and/or team rankings among the teams (e.g., one or more ranked list of the plurality of teams based on team scores). The user interface may be configured to display the last updated version of the detailed information, and also may be configured to refresh, either periodically or by user initiation, the displayed information to ensure that the displayed information is synchronized with the recent updates made at the issuer system 114 or any other authorized system in communication with the exemplary environment 1008.

The user interface may additionally include features to enable exchange of private messages (e.g., instant messages) and/or group chat messages over the network 102. For example, when a first user 108 belonging to team one 111 selects a group chat message feature on a user device 112 of the first user 108, the user interface may load one or more input features (e.g., one or more text fields), at which the first user 108 may enter a message targeted for all other user devices 112 within team one 111. As another example, a second user 108 belonging to team one 111 may select a private messaging feature on user device 112 of the second user 108. In response to this user selection, the user interface may load one or more input features (e.g., one or more text fields), and the second user 108 may enter a private message targeted for one or more specific target users within team one 111, as well as indications of the one or more specific target users. Consequently, each private message being transmitted over the network 102 may include a message originating from a user 108, as well as an accompanying metadata indicating one or more target users. In some implementations, the exchange of private messages and/or the group chat messages may be limited to users within the same team, such that users may only communicate with teammates. Additionally, or alternatively, the issuer system 114 may allow the exchange of messages and/or the group chat messages among users belonging to different teams.

Figure 2:
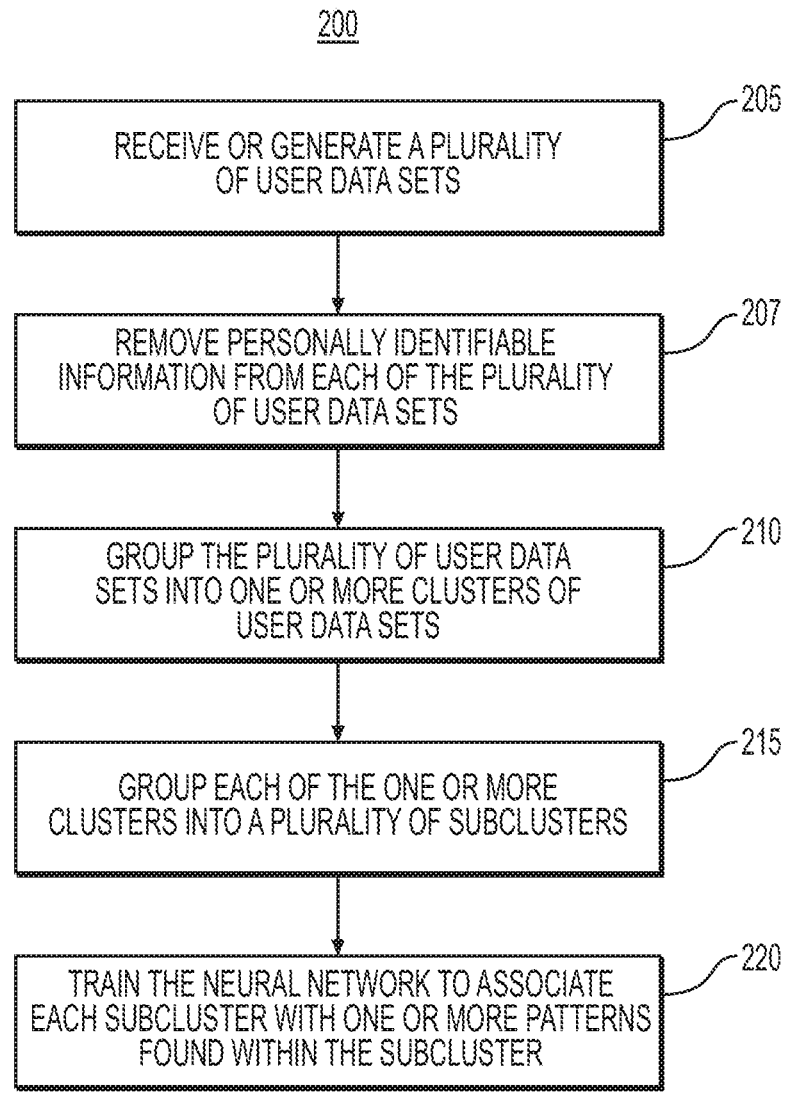
FIG. 2 depicts a flowchart of an exemplary method for generating a customized training dataset for a neural network and training the neural network using the training dataset, according to one or more embodiments.

FIG. 2 depicts a flowchart of an exemplary method 200 for generating a customized training data set for a neural network (such as, for example, an RNN), and training the neural network using the training data set. In method 200, the issuer server 104 may first receive or generate a plurality of user data sets in an issuer database 106 (Step 205). Each user data set may comprise a user identification data of a user 108 and a detailed user data of the user 108. For example, if a user data set corresponds to a data set of a particular credit card account of a first user 108, the user data set may include an identification of the first user 108 (e.g., the full name, an address, or a unique identifier of the first user 108, an account identification, or any combination thereof), as well as a detailed user data (e.g., individual transactions made or authorized by the first user). In one or more embodiments, the detailed user data of each of the user data sets may be, for example, a collection of transaction data transmitted to the issuer server 104 from the POS system 110, pertaining particularly to the user account represented by the user data set.

The plurality of user data sets in issuer database 106 may be anonymized and/or sanitized by removing, obfuscating, or converting all personally identifiable information from all of the user data sets. (Step 207). Personally identifiable information may be any data attribute subject to protection as defined by a predetermined criteria, and may include, for example, name, social security number, credit card number, expiry date information, email address, account number, an identifier of users associated with an account, an identifier of an account, contact information, or any other piece of information that is specific to the identity of the user 108 or the user's account. In one or more embodiments, the plurality of user data sets may be anonymized by filtering the plurality of user data sets through a data filtering system which detects user data sets with personally identifiable information based on predetermined conditions, and removes and/or replaces the personally identifiable information. The issuer system 114 may be configured such that protection of the personally identifiable information is strictly implemented, or implemented with additionally heightened privacy standards, at the user interface for users 108 placed into teams. For example, anonymized user names may be used for team standings, instant messages, or group chat messages. The issuer system 114 may also be configured such that, when a new series of transactions is added to one or more team metrics, the details of the newly added series of transaction are never disclosed to users other than the user responsible for the new series of transactions. Rather, the issuer system 114 may be configured such that, the other members in the team may only see a metric associated with the newly added series of transactions, and/or a characteristic associated with the metric.

The personally identifiable information, though removed and/or blinded, may still be linked to the plurality of user data sets. The personally identifiable information may be stored in case the information is needed to verify a user or to comply with federal or other applicable law. For example, when the user securely logs onto the issuer server 104 for access to his or her own account, the issuer server 104 may access the user's name, address, social security number, birth date, or other personally identifiable information to verify that a valid user is accessing the information. The removed or blinded personally identifiable information may be placed in the same server as the server storing the anonymized and/or sanitized user data sets. If a system administrator of the issuer server 104 chooses, the personally identifiable information may be placed in a separate server for increased security.

The plurality of user data sets may then be grouped into clusters (Step 210). The grouping may be achieved by a clustering or classification of the user data sets, with one or more predetermined criteria as the parameters for grouping the user data sets. The predetermined criteria for grouping may include, for example, one or more of annual income, education level, family size, job category, or any other criteria which represents a user class independent of quality metrics of fiscal decisions. That is, the grouping operation of Step 210 may group users into one or more categories (e.g., socio-economic classes) without regard to user's fiscal decision behavior qualities. For example, in the exemplary scheme depicted in FIG. 4, classified cluster 421 may represent "all users with annual income greater or equal to $100,000." As shown, cluster 421 may include both users with credit scores at or above 700, and users with credit scores below 700.

In some implementations, the grouping operation of Step 210 may occur using any measurement of similarity among the users, as long as the grouping is based on a criteria that is independent of fiscal decision behavior qualities. For example, users grouped into the same cluster may have a similar income level (e.g., incomes within a range of income), such that predictions can be made on attributes of a particular user based on data corresponding to other users in the same cluster. For the purpose of grouping in Step 210, any clustering algorithm that groups data sets based on a clustering criteria may be used. For implementing a clustering algorithm, the clustering data space may be defined as, for example, an n-dimensional space having an axis for each of the clustering criteria. For example, Step 210 may be implemented using a classical K-means clustering algorithm. Alternatively, Step 210 may be implemented using a more complex algorithm aiming for enhanced modeling results, such as, for example, a Density-Based Spatial Clustering of Applications with Noise (DBSCAN) approach.

After grouping into clusters, each cluster may then be grouped into a plurality of subclusters (Step 215). This grouping operation may be achieved by clustering or classification of the user data sets within each cluster, with one or more predetermined criteria as the parameters for grouping the user data sets. The predetermined criteria for grouping may include one or more of credit score, an account balance, available credit, percentage of credit used of users in each of the one or more clusters, or any other metrics which indicates a quality of fiscal decisions made by the user. The use of these metrics as classification criteria may result in multiple ranges of users within a particular cluster, including a range of users with higher quality metrics relating to fiscal decisions, in addition to one or more other ranges of users within the cluster with lower quality metrics relating to fiscal decisions, as will be described in further detail below. For example, as noted above, in the exemplary scheme depicted in FIG. 4, classified cluster 421 may represent "all users with annual income greater or equal to $100,000." Additionally, cluster 421 may include a subcluster of users 411 with credit scores at or above 700, and may include a subcluster of users 412 with credit scores below 700. In this example, subcluster 411 may be indicative of users with higher quality metrics relating to fiscal decisions, while subcluster 412 may be indicative of users with lower quality metrics relating to fiscal decisions.

In some implementations, the grouping operation of Step 215 may occur using any measurement of similarity among the users, as long as the grouping of subclusters is based on a criteria associated with the users' quality of fiscal decisions (e.g., spending behavior). For example, with use of a Dynamic Time Warping (DTW) algorithm which compares sequences of different time-series data having different time instance and time interval, a dynamically customized clustering criteria, which incorporates the similarity of users' spending behaviors, may be determined. For the purpose of subcluster grouping in Step 215, any clustering algorithm that groups data sets based on a selected criteria may be used. For implementing such a clustering algorithm, the clustering data space may be defined as, for example, an n-dimensional space having an axis for each of the subclustering criteria. For example, Step 215 may be implemented using a classical K-means clustering algorithm. Alternatively, Step 215 may be implemented using a more complex algorithm aiming for enhanced modeling results, such as, for example, a Density-Based Spatial Clustering of Applications with Noise (DBSCAN) approach.

After the plurality of user data sets are grouped into subclusters, a neural network (e.g., RNN) may be trained based on the subclusters (Step 220). As described above with respect to Step 205, each user data set may include detailed user data, and the detailed user data may be a collection of transaction data transmitted to the issuer server 104 from the POS system 110, pertaining particularly to the user account represented by the user data set. Thus, a collection of a particular user's 108 transaction data represents a history of purchase decisions made by the user 108, in a time-based sequence. Each subcluster may be provided as a training data set for the neural network (e.g., RNN), and the training data set may include at least the detailed user data of each user data set in the subcluster. Based on the training of the neural network (e.g., RNN), the neural network (e.g., RNN) may associate each subcluster with one or more patterns (e.g., sequential patterns) found within the subcluster.

The neural network (e.g., RNN) being trained in Step 220 may be any type of neural network which can use an internal state (e.g., memory) to process sequences of inputs from the collection of transaction data of each user. In some implementations, LSTM may be the type of neural network used for the training of the model (e.g., Step 220) and the subsequent user classification (e.g., Step 315 as described in more detail below) in accordance with one or more embodiments of the present disclosure. For example, in a particular iteration of training and/or subsequent classification operations, an LSTM may compare two sequences of data, where each of the two sequences may have its own time-stamped data points. The data points in a given sequence may be fiscal transactions of the particular user 108 to whom the sequence corresponds. For example, a first sequence may have four large time-stamped transactions (e.g., $100, $39, $90, and $40), and at respective time stamps sufficiently similar (e.g., within a threshold range) to these four transactions, a second sequence may also have four large, similar transactions (e.g., $98, $40, $85, and $35). In addition, the first sequence and the second sequence may both have smaller (e.g., smaller below a threshold) transactions, at disparate time stamps. After comparing these two sequences, the LSTM may output that the first sequence and the second sequence are matched successfully (e.g., belonging to the same subcluster, for the purpose of training a model and/or classifying a user), because of the similarity of the large transactions being considered and the dissimilarity of the smaller transactions being neglected. The neural network (e.g., RNN), such as the LSTM described by way of example above, may be stored in the issuer server 104, the issuer database 106, or any other memory device accessible by the issuer server 104.

Figure 3:
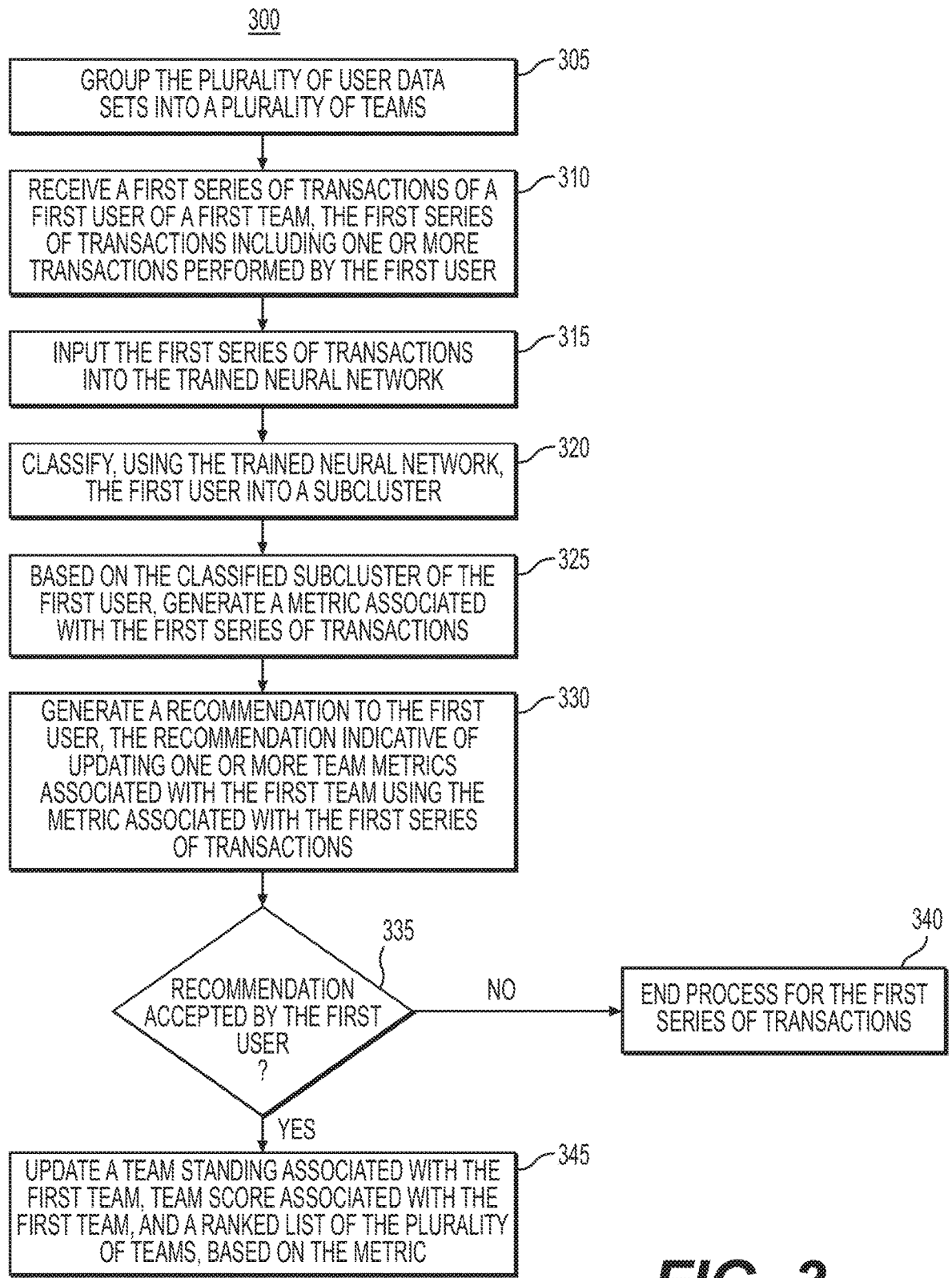
FIG. 3 depicts a flowchart of an exemplary method for generating a user-facing recommendation to add a metric resulting from the series of transactions to update team metrics, according to one or more embodiments.

FIG. 3 depicts a flowchart of an exemplary method 300 for generating a user-facing recommendation to add a metric resulting from the series of transactions to update team metrics, according to one or more embodiments.

First, a computing system (e.g., the issuer system 114) may group the users 108 into a plurality of teams, by grouping the plurality of user data sets (Step 305). For example, such grouping may be performed semi-randomly, as described above with respect to FIG. 1B. Then, a computing system (e.g., the issuer system 114) may dynamically receive a series of transactions, e.g., a first series of transactions, associated with a specific user of a specific team, e.g., a first user 108 team one 111 (Step 310). In one or more embodiments, the process of dynamically receiving the first series of transactions may be initiated and performed independently of the process of preparing a training data set for a neural network (e.g., RNN) and training the neural network (e.g., RNN) (e.g., the exemplary method 200 of FIG. 2). For example, data collection for creation of a training data set for the neural network (e.g., RNN) may occur at predetermined time intervals at a neural network (e.g., RNN) training subsystem of the issuer server 104, while data collection of transactions for the purpose of generating recommendations for a first user 108 may occur separately at another independent subsystem (e.g., user recommendation subsystem). In this way, a user recommendation subsystem may use any available previously trained neural network (e.g., RNN) at the neural network training subsystem (e.g., the neural network last trained by the neural network training subsystem). The neural network (e.g., RNN) training subsystem and the user recommendation subsystem may both be subsystems implemented by a computing system, such as the issuer server 104.

Alternatively, the process of receiving the first series of transactions in accordance with Step 310, may be performed by the issuer server 104, only after issuer server 104 completely performs a full iteration of the neural network (e.g., RNN) training process in accordance with, for example, exemplary method 200 depicted in the flowchart of FIG. 2. Accordingly, the exemplary method 300 may only be performed after completion of a neural network (e.g., RNN) training process, rather than, for example, allowing method 200 and method 300 to run independently of each other. In such an arrangement, the exemplary method 300 may be a continuation of the exemplary method 200.

In one or more embodiments, the dynamic receiving of the first series of transactions (e.g., Step 310) may be real-time, or substantially real-time, for each transaction within the first series of transactions. Additionally, or alternatively, the dynamic receiving of the first series of transactions (e.g., Step 310) may be conducted at a predetermined interval. For example, at midnight of each day, the issuer server 104 may retrieve all transactions made by the first user 108 during the 24-hour interval, in a series of transactions sorted from oldest to newest, from a data source such as issuer database 106.

Next, the first series of transactions may be input into the trained neural network (e.g., RNN) (Step 315). As described above with respect to FIG. 2, the neural network (e.g., RNN) may have been trained to make associations between one or more sequential patterns and a subcluster of users. Thus, the trained neural network may be uniquely customized for classifying this particular observed user (e.g., the first user 108 with whom the first series of transactions are associated) to a particular subcluster of users, based on the first series of transactions of the first user 108. Accordingly, the trained neural network (e.g., RNN) may be used to classify the first user 108 into a subcluster (Step 320). The output of the classification step may be, for example, one or more probability values for whether this user 108 belongs to certain subclusters. For example, the output may indicate that according to the first series of transactions, the first user 108 has a 90% chance of belonging to the subcluster with credit score less than 700, and 10% chance of belonging to the subcluster with credit score at or higher than 700. The output also may be a selection or identification of one subcluster, which has the highest likelihood of having the first user 108 as a member.

With the output from the classification step, the computing system (e.g., issuer system 114) may proceed to generate a metric associated with the first series of transactions (Step 325). The metric may be any one or more values indicative of quality of the first series of transactions, derived based on the classification results from Step 320. The metric may include, for example, a simple binary variable which may be set to either a positive flag value (e.g., the transactions characterized as good, wise, above average, etc.) or a negative flag value (e.g., the transactions characterized as bad, reckless, below average, etc.), resulting from applying a predetermined threshold to the neural network (e.g., RNN)-based classification results. Additionally, or alternatively, the metric may include, for example, a numeric score associated with the first series of transactions. Such a numeric score may be computed based on, for example, the subcluster classification performed at Step 320 described above (e.g., a classification result indicating 10% chance of belonging to a target subcluster may render a score of 10 out of 100). Such a numeric score may alternatively be arrived at by using a weighted combination of the classification probability values output by Step 320, with the weights being predetermined by, for example, user input.

The computing system (e.g., issuer system 114) may then generate a recommendation to the first user 108, the recommendation being indicative of (e.g., urging or requesting users to consider) updating one or more team metrics associated with the first team (e.g., team one 111), using the generated metric associated with the first series of transactions (Step 330). The computing system (e.g., issuer system 114) may use the user interface at a user device 112 of the first user 108 to indicate to the first user 108 that the first series of transactions has been tagged with a certain metric (e.g., a numeric score or any other quality indicator such as "good" or "bad"). In addition to informing the user of this tagged metric, the user interface may display a recommendation for adding the metric to one or more team metrics of the first team (e.g., team one 111). In this process, the user interface may display preconfigured texts to the first user 108, which indicates, for example, incentives or rewards for adding individual metrics to the team metrics.

The user interface may provide a prompt, an interactive tool, a link, or an instruction which allows the first user 108 to accept the recommendation (Step 335). If the computing system (e.g., issuer system 114) detects that the first user 108 declined the recommendation (e.g., by proactively inputting a negative response, exiting the interface, loading or entering another series of transactions, or initiating any other response predetermined as a decline), then the computing system may end the process for the first series of transactions (Step 340).

If the computing system (e.g., issuer system 114) detects that the first user 108 accepted the recommendation (e.g., by proactively inputting a positive response, proceeding to steps guided by the recommendation, entering of the first series of transactions for updating the team metrics, or initiating any other response predetermined as an acceptance), then the computing system may update one or more team metrics associated with the first team (e.g., team one 111) (Step 345). For example, the computing system may update a team standing associated with the first team (e.g., standing of team members within the first team based on each user's metrics) and update a team score associated with the first team (e.g., a composite score of the first team, or any other quality metric indicative of the first team's performance as a whole).

Additionally, the computing system (e.g., issuer system 114) may update a ranked list of the plurality of teams, based on the updates made to the team score of the first team (e.g., team one 111). For example, the updating of the team score or any other team metrics of the first team may affect the ranked position of the first team (e.g., team one 111) among the plurality of teams under one or more ranking criteria. One ranking criterion may be ranking the plurality of teams by overall team score, and other ranking criteria may include, for example, ranking by team scores' trends, by team scores for a particular time period, by median individual metrics for each team, etc. Accordingly, the computing system may update the rankings and/or the ranked lists for predetermined ranking criteria, and make the rankings and/or the ranked lists available for display at the user interface. Such updates to the information about the teams may occur dynamically and/or periodically. For example, the updates may be set to occur via periodic synchronizations, push or pull operations, synchronous or asynchronous updates, modifications made during scheduled maintenance, real-time updates in response to a detected event (e.g., an addition of a user activity), or any other known or suitable manner by which a centrally stored information about the teams may be updated with authorized modifications.

Figure 4:
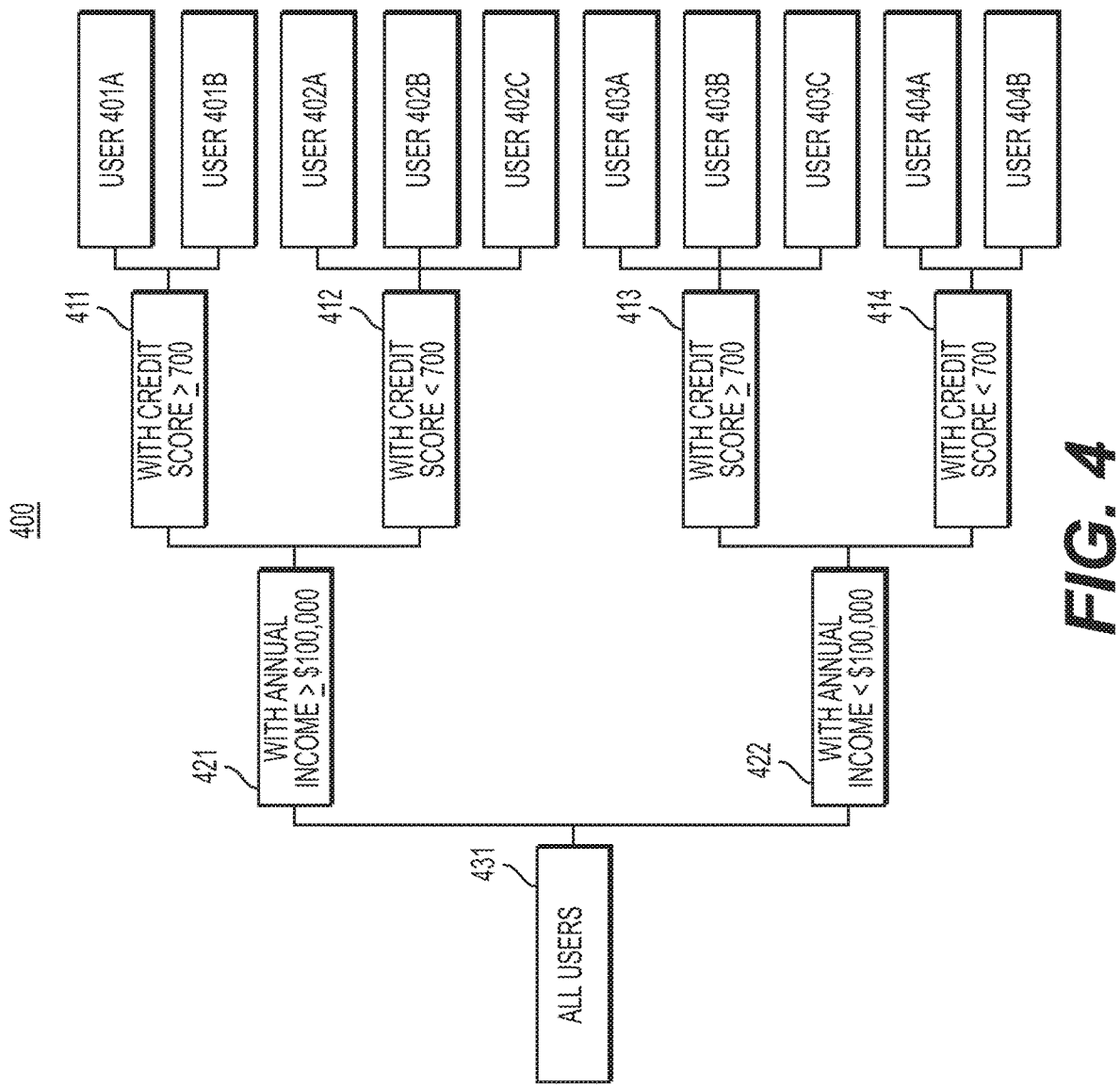
FIG. 4 depicts an example scheme of how users may be grouped into clusters and subclusters, according to one or more embodiments.

FIG. 4 depicts an example scheme 400 of how users 401A-404B may be grouped into clusters and subclusters, according to one or more embodiments. As described above with respect to FIG. 2, a general collection of users 431 may be grouped into clusters at a first level of data hierarchy, such as within cluster 421 indicative of those users with annual income at or above a threshold value, and cluster 422 indicative of those users with annual income below the threshold value. One or more predetermined criteria for grouping at this level may include one or more of annual income, education level, family size, job category, or any other criteria which represents a user class independent of quality metrics of fiscal decisions. Subsequently, the clusters 421 and 422 may each be grouped into subclusters at a second level of data hierarchy, such as a subcluster 411 indicative of users with a credit score at or above a threshold value and another subcluster 412 indicative of users with a credit score below the threshold value. The predetermined criteria for grouping at the subcluster level may include one or more of credit score, an account balance, available credit, percentage of credit used, or any other metric which indicates a quality of fiscal decisions made by the user. In the example scheme 400, users 401A-401B may be grouped under subcluster 411, users 402A-402C may be grouped under subcluster 412, users 403A-403C may be grouped under subcluster 413, and users 404A-404B may be grouped under subcluster 414, in the training data set of the neural network (e.g., RNN). As described above with respect to FIG. 2, this scheme may be implemented on a plurality of user data sets, by clustering, grouping, or labeling the user data sets according to these clusters and subclusters, in one or more memory devices accessible by issuer server 104 such as issuer database 106.

Figure 5:
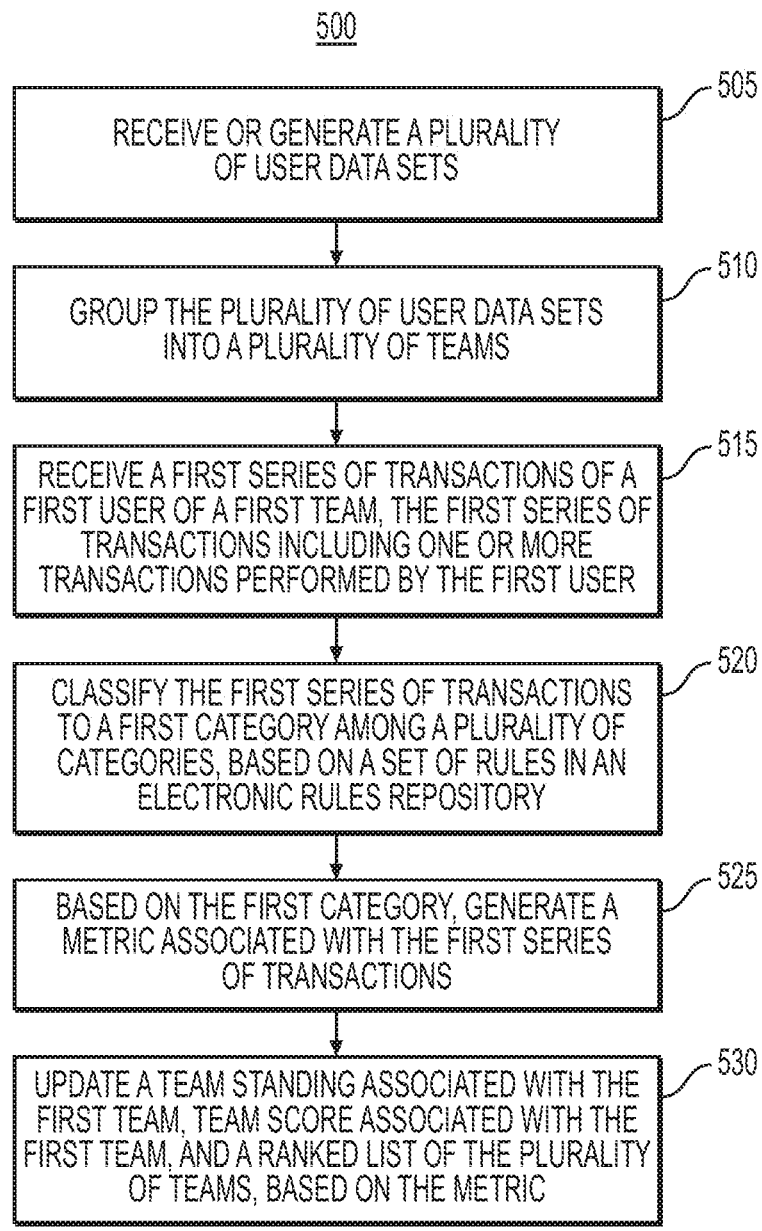
FIG. 5 depicts a flowchart of an exemplary method for collaborative monitoring of resource usage metrics, according to one or more embodiments.

FIG. 5 depicts a flowchart of an exemplary method 500 for collaborative monitoring of resource usage metrics, according to one or more embodiments. First, a computing system (e.g., the issuer system 114) may receive or generate a plurality of user data sets, in a database in communication with the computing system (e.g., issuer database 106) (Step 205). Each user data set may comprise a user identification data of a user 108 and a detailed user data of the user 108. For example, if a user data set corresponds to a data set of a particular credit card account of a first user 108, the user data set may include an identification of the first user 108 (e.g., the full name, an address, or a unique identifier of the first user 108, an account identification, or any combination thereof), as well as a detailed user data (e.g., individual transactions made or authorized by the first user 108). In one or more embodiments, the detailed user data of each of the user data sets may be, for example, a collection of transaction data transmitted to the issuer server 104 from the POS system 110, pertaining particularly to the user account represented by the user data set. The plurality of user data sets may be anonymized and/or sanitized by removing, obfuscating, or converting all personally identifiable information from all of the user data sets, as described in detail above with respect to Step 207 of FIG. 2.

Based on the plurality of user data sets, a computing system (e.g., the issuer system 114) may group the users 108 into a plurality of teams, by grouping the plurality of user data sets (Step 510). Such grouping may be performed semi-randomly, as described above with respect to FIG. 1B.

Then, a computing system (e.g., the issuer system 114) may receive a series of transactions, e.g., a first series of transactions, associated with a specific user of a specific team, e.g., a first user 108 a first team (e.g., team one 111) (Step 515). In the exemplary method 500, the first series of transaction may be received by the input initiated by the first user 108. For example, the receiving of the first series of transactions may be real-time, or substantially real-time, for each transaction within the first series of transactions, if the user 108 initiates inputting of each transaction as soon as the transaction occurs at the POS system 110 (e.g., voluntarily, or in response to a reminder and/or notification preset to appear after a transaction at the user interface). Additionally, or alternatively, the receiving of the first series of transactions (e.g., Step 310) may be conducted at a predetermined interval. For example, at midnight of each day, the issuer server 104 may prompt a first user 108 to enter all transactions made by the first user 108 during the 24-hour interval, and receive one or more series of transactions from the first user 108 including the first series of transactions.

After receiving the first series of transactions, the computing system (e.g., the issuer system 114) may classify the first series of transactions to a first category (e.g., a category among a plurality of categories), based on a set of classification rules stored in an electronic rules repository (Step 520). The electronic rules repository may be included in any database in communication with the computing system, such as, for example, issuer database 106. The set of rules may include one or more mappings between a plurality of categories and a plurality of transaction types. For example, the set of rules may include a mapping between transaction type "casino spending" and category "bad spending," and also include a mapping between transaction type "paying balance in full" and category "good spending." The one or more mappings may be predetermined data and/or dynamically updated data in the electronic rules repository, based on, for example, user inputs and/or data feed from one or more computing systems in communication with the computing system.

Thus, when a first series of transactions is received, the computing system (e.g., the issuer system 114) may, for example, (i) identify a first transaction type associated with the first series of transactions (e.g., by reading from one or more metadata associated with the first series of transactions), and (ii) determine the first category associated with the transaction type by applying the transaction type to the one or more mappings in the set of rules. The computing system may identify a transaction type by, for example, reading metadata included in a transaction received from a POS system 110, querying a POS system 110 regarding a transaction to receive the transaction type, electronically classifying a transaction into a type using transaction type rules, and manually classifying a transaction into a type via an operator's review of the transaction. In addition, if the computing system identifies more than one transaction types in the first series of transactions, the computing system may select one transaction type by, for example, determining the most relevant transaction type using predetermined rules on identifying highest relevance (e.g., the transaction type corresponding to the largest amount spent, the transaction type with highest number of occurrences, etc.). Alternatively, if the computing system identifies more than one transaction types in the first series of transactions, the computing system may handle each transaction type separately, at the next step of generating a metric associated with the first series of transactions.

Next, based on the first category, the computing system may generate a metric associated with the first series of transactions (Step 525). The metric generating function under this step may be performed in the same way as the metric generating function described in detail above with respect to Step 325 of FIG. 3.

Based on the generated metric, the computing system may update one or more team metrics associated with the first team (e.g., team one 111) (Step 530). The functions of updating one or more team metrics, such as the team standing associated with the first team (e.g., team one 111), the team score associated with the first team (e.g., team one 111), and the ranked list of the plurality of teams, may be performed in the same way as the updating function described in detail above with respect to Step 345 of FIG. 3.

One aspect by which the exemplary method 500 differs from the exemplary method 300 is that, the exemplary method does not generate or prompt recommendations for users. In the exemplary method 500, the first series of transactions are transactions received from the first user, as described above with respect to Step 515. Thus, rather than automatically collecting transactions and receiving user's approval regarding the collected transactions, the exemplary method 500 may advantageously operate on data voluntarily provided from the user, eliminating the need for a separate recommendation/approval process.

Figure 6:
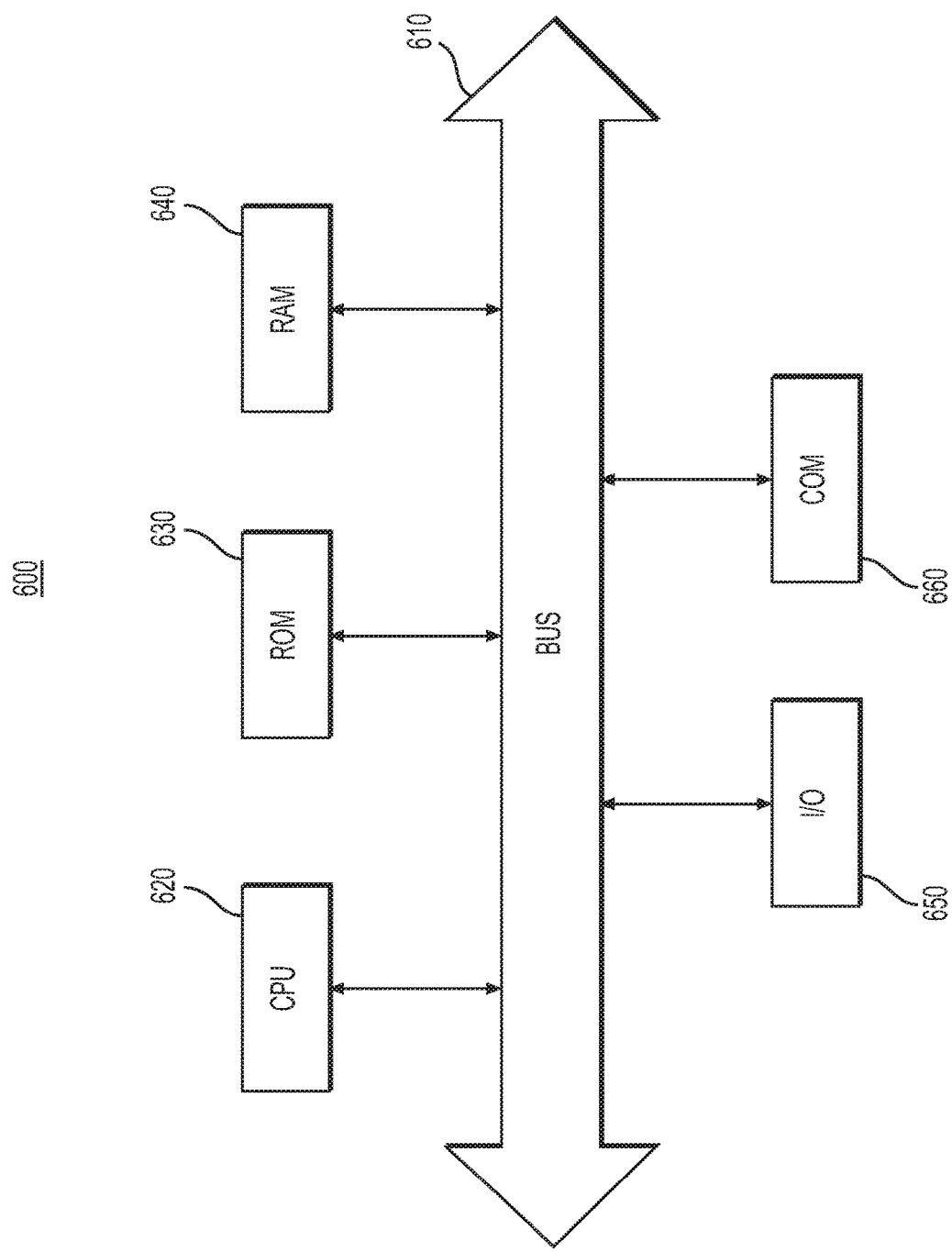
FIG. 6 depicts an exemplary computer device or system, in which embodiments of the present disclosure, or portions thereof, may be implemented.

FIG. 6 depicts a high-level functional block diagram of an exemplary computer device or system, in which embodiments of the present disclosure, or portions thereof, may be implemented, e.g., as computer-readable code. In some implementations, the issuer server 104 (depicted in FIG. 1) may correspond to device 600. Additionally, or alternatively, a server system comprising the issuer server 104 and the issuer database 106 (depicted in FIG. 1) may correspond to device 600. Additionally, each of the exemplary computer servers, databases, user interfaces, and methods described above with respect to FIGS. 1-5 can be implemented via device 600 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-5.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-5, may be implemented using device 600. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 6, device 600 may include a central processing unit (CPU) 620. CPU 620 may be any type of processor device including, for example, any type of special purpose or a general-purpose microprocessor device. As will be appreciated by persons skilled in the relevant art, CPU 620 also may be a single processor in a multi-core/multi-processor system, such system operating alone, or in a cluster of computing devices operating in a cluster or server farm. CPU 620 may be connected to a data communication infrastructure 610, for example, a bus, message queue, network, or multi-core message-passing scheme.

Device 600 also may include a main memory 640, for example, random access memory (RAM), and also may include a secondary memory 630. Secondary memory 630, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 630 may include other similar means for allowing computer programs or other instructions to be loaded into device 600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 600.

Device 600 also may include a communications interface ("COM") 660. Communications interface 660 allows software and data to be transferred between device 600 and external devices. Communications interface 660 may include a modem, a network interface (such as an Ethernet card), a communications port, a PCMCIA slot and card, or the like. Software and data transferred via communications interface 660 may be in the form of signals, which may be electronic, electromagnetic, optical, or other signals capable of being received by communications interface 660. These signals may be provided to communications interface 660 via a communications path of device 600, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer system for training and executing a neural network for collaborative monitoring of resource usage metrics, the system comprising:

a memory having processor-readable instructions stored therein; and at least one processor configured to access the memory and execute the processor-readable instructions, which when executed by the processor configures the processor to perform a plurality of functions, including functions for:

receiving or generating a plurality of user data sets, wherein each user data set of the plurality of user data sets comprises a user identification data of a user and a detailed user data of the user;

grouping the plurality of the user data sets into one or more clusters of user data sets based on criteria that is independent of fiscal decision behavior qualities of the user;

grouping each of the one or more clusters into a plurality of subclusters based on criteria associated with fiscal decision behavior qualities of the user;

for each of the plurality of subclusters, training the neural network to associate the subcluster with one or more sequential patterns found within the subcluster, based on the user data sets in the subcluster, to generate a trained neural network;

grouping the plurality of user data sets into a plurality of teams, each team in the plurality of teams including a plurality of teamed user data sets among the plurality of user data sets;

receiving a first series of transactions of a first user, the first user corresponding to a first teamed user data set included in the plurality of teamed user data sets in a first team among the plurality of teams, and the first series of transactions including one or more transactions performed by the first user;

inputting the first series of transactions into the trained neural network;

classifying, using the trained neural network, the first user into a subcluster among the plurality of subclusters, based on the first series of transactions input into the trained neural network, to generate a classified subcluster of the first user;

based on the classified subcluster of the first user, generating a metric associated with the first series of transactions;

generating a recommendation to the first user, the recommendation requesting the first user to enter the metric associated with the first series of transactions for updating one or more team metrics associated with the first team;

updating a team standing associated with the first team based on the metric associated with the first series of transactions; and transmitting the updated team standing to the plurality of teams upon the first user entering the metric associated with the first series of transactions.

2. The system of claim 1, wherein the plurality of functions further comprise:

updating a team score associated with the first team based on the metric associated with the first series of transactions, to generate an updated team score associated with the first team.

3. The system of claim 2, wherein the plurality of functions further comprise:

updating a ranked list of the plurality of teams, based on the updated team score associated with the first team.

4. The system of claim 1, wherein the plurality of functions further comprise:

receiving one or more messages from one or more users included in the first team, each of the one or more messages comprising a metadata indicating a target user included in the first team.

5. The system of claim 4, wherein the plurality of functions further comprise:

transmitting each of the one or more messages to a device associated with the target user.

6. The system of claim 1, wherein the plurality of functions further comprise:

removing personally identifiable information from each of the plurality of user data sets.

7. The system of claim 1, wherein the plurality of functions further comprise:

transmitting a notification indicative of the classified subcluster of the first user to one or more devices associated with one or more users included in the first team.

8. The system of claim 7, wherein the notification further comprises the metric associated with the first series of transactions.

9. A computer-implemented method for collaborative monitoring of resource usage metrics, the method comprising:

receiving or generating, by one or more processors, a plurality of user data sets, wherein each user data set of the plurality of user data sets comprises a user identification data of a user and a detailed user data of the user;

grouping the plurality of the user data sets into one or more clusters of user data sets based on criteria that is independent of fiscal decision behavior qualities of the user;

grouping each of the one or more clusters into a plurality of subclusters based on criteria associated with fiscal decision behavior qualities of the user;

grouping, by the one or more processors, the plurality of user data sets into a plurality of teams, each team in the plurality of teams including a plurality of user data sets;

receiving from a first user, at a user interface, a first series of transactions of the first user, the first user corresponding to a user data set included in the plurality of user data sets in a first team among the plurality of teams, and the first series of transactions including one or more transactions performed by the first user;

classifying, by the one or more processors, the first series of transactions to a first category among a plurality of categories, based on a set of rules in an electronic rules repository;

based at least in part on the first category, generating, by the one or more processors, a metric associated with the first series of transactions;

updating, by the one or more processors, a team standing associated with the first team based on the metric; and transmitting, by the one or more processors, the updated team standing to the plurality of teams.

10. The method of claim 9, wherein the set of rules comprises one or more mappings between the plurality of categories and a plurality of transaction types.

11. The method of claim 10, wherein the classifying the first series of transactions to the first category further comprises:
   identifying, by the one or more processors, a first transaction type of the plurality of transaction types, the first transaction type being associated with the first series of transactions from one or more metadata associated with the first series of transactions; and
   determining, by the one or more processors, the first category by applying the first transaction type to the one or more mappings.

12. The method of claim 9, further comprising:
   updating, by the one or more processors, the team score associated with the first team based on the metric, to generate an updated team score associated with the first team.

13. The method of claim 12, further comprising:
   updating, by the one or more processors, a ranked list of the plurality of teams, based on the updated team score associated with the first team.

14. The method of claim 9, further comprising:
   receiving, by the one or more processors, one or more messages from one or more users included in the first team, each of the one or more messages comprising a metadata indicating a target user included in the first team.

15. The method of claim 14, further comprising:
   transmitting, by the one or more processors, each of the one or more messages to a device associated with the target user.

16. The method of claim 9, wherein the receiving or generating the plurality of user data sets further comprises:
   removing, by the one or more processors, personally identifiable information from each of the plurality of user data sets.

17. The method of claim 9, further comprising:
   transmitting, by the one or more processors, a notification indicative of the first category to one or more devices associated with one or more users included in the first team.

18. The method of claim 17, wherein the notification further comprises the metric associated with the first series of transactions.

19. A computer system for training and executing a neural network for collaborative monitoring of resource usage metrics, the computer system comprising:
   a memory having processor-readable instructions stored therein; and
   at least one processor configured to access the memory and execute the processor-readable instructions, which when executed by the processor configures the processor to perform a plurality of functions, including functions for:
      receiving or generating a plurality of user data sets, wherein each user data set of the plurality of user data sets comprises a user identification data of a user and a detailed user data of the user;
      removing personally identifiable information from each of the plurality of user data sets;
      grouping the plurality of the user data sets into one or more clusters of user data sets based on criteria that is independent of fiscal decision behavior qualities of the user;
      grouping each of the one or more clusters into a plurality of subclusters based on criteria associated with fiscal decision behavior qualities of the user;
      for each of the plurality of subclusters, training the neural network to associate the subcluster with one or more sequential patterns found within the subcluster, based on the user data sets in the subcluster, to generate a trained neural network;
      grouping the plurality of user data sets into a plurality of teams, each team in the plurality of teams including a plurality of teamed user data sets among the plurality of user data sets;
      receiving a first series of transactions of a first user, the first user corresponding to a teamed user data set included in the plurality of teamed user data sets in a first team among the plurality of teams, and the first series of transactions including one or more transactions performed by the first user;
      inputting the first series of transactions into the trained neural network;
      classifying, using the trained neural network, the first user into a subcluster among the plurality of subclusters, based on the first series of transactions input into the trained neural network, to generate a classified subcluster of the first user;
      based on the classified subcluster of the first user, generating a metric associated with the first series of transactions;
      generating a recommendation to the first user, the recommendation requesting the first user to enter the metric associated with the first series of transactions for updating one or more team metrics associated with the first team;
      in response to determining that the first user indicated an acceptance of the recommendation, updating a team standing associated with the first team based on the metric associated with the first series of transactions;
      in response to determining that the first user indicated an acceptance of the recommendation, updating a team score associated with the first team based on the metric, to generate an updated team score associated with the first team;
      in response to determining that first user accepted the recommendation, updating a ranked list of the plurality of teams, based on the updated team score associated with the first team;
      transmitting the updated team standing, the updated team score, and the updated ranked list of the plurality of teams, to the plurality of teams in response to determining that the first user accepted the recommendation;
      receiving one or more messages from one or more users included in the first team, each of the one or more messages comprising a metadata indicating a target user included in the first team; and
      transmitting each of the one or more messages to a device associated with the target user.

* * * * *